No. 626,018. Patented May 30, 1899.
S. DUNLOP & G. H. OATWAY.
MUD GUARD.
(Application filed Oct. 15, 1898.)
(No Model.)
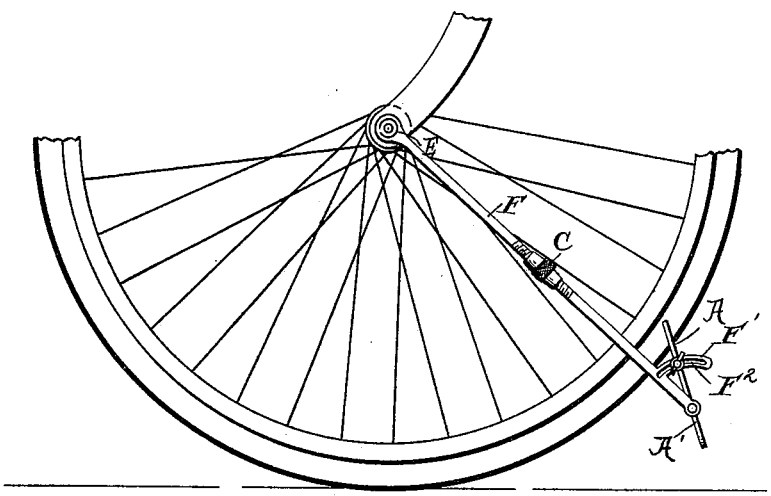
Fig. 1.
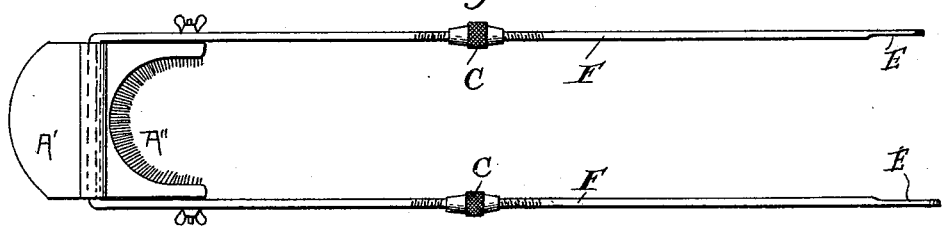
Fig. 2.
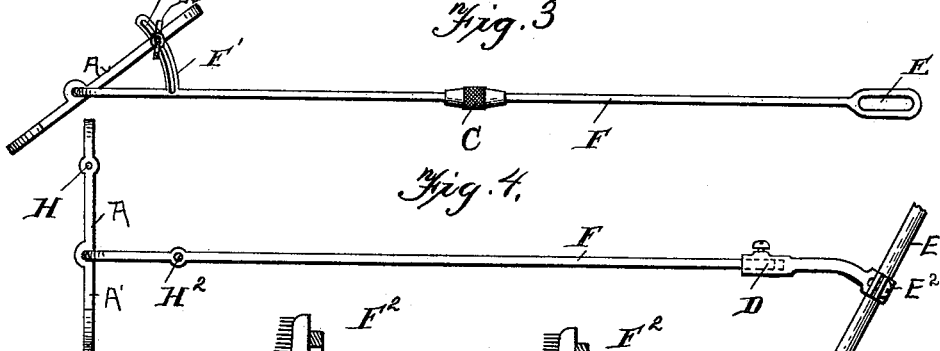
Fig. 3.
Fig. 4.
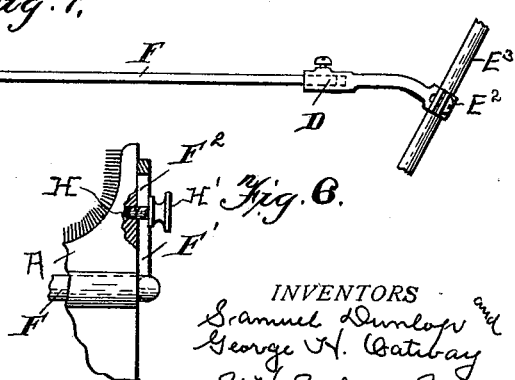
Fig. 5. Fig. 6.
WITNESSES:
Geo. E. Frech.
N. L. Collamer.
INVENTORS
Samuel Dunlop and
George H. Oatway
J. H. Jochum Jr.
Attorney

United States Patent Office.

SAMUEL DUNLOP AND GEORGE HENRY OATWAY, OF DUNEDIN, NEW ZEALAND.

MUD-GUARD.

SPECIFICATION forming part of Letters Patent No. 626,018, dated May 30, 1899.

Application filed October 15, 1898. Serial No. 693,687. (No model.)

*To all whom it may concern:*

Be it known that we, SAMUEL DUNLOP, blacksmith, and GEORGE HENRY OATWAY, merchant, subjects of the Queen of Great Britain, and residents of the city of Dunedin, in the British Colony of New Zealand, have invented new and useful Improvements in Mud-Guards for Pneumatic and Solid-Rubber or Composition Tires, of which the following is a specification.

Our invention relates to an improved appliance for scraping and deflecting mud, water, sand, or the like from the tires of wheels and from a point near the ground. The scraper is held in position by rods or tubes, preferably one on each side, fixed to a suitable part of the frame carrying the wheels and is adjustable as to its distance from the tire and is preferably resilient.

Referring to the accompanying drawings, Figure 1 is a view of our improved scraper and mud-guard applied to the front wheel of a bicycle. Fig. 2 is a plan view showing a modified form. Fig. 3 is a side view of scraper shown in Fig. 1. Fig. 4 is a side view of scraper shown in Fig. 2, with a modified form of adjustment of the rods and with the retaining-pin removed, so that the scraper stands in a vertical position; and Figs. 5 and 6 are detail views showing the means for adjusting the angle of the scraper.

A is the scraper. A' is the part of same projecting behind as an apron to deflect the intercepted substances to the ground. A'' is the brush form of same.

C is a right and left handed thread and hand-nut adjustment, and D is a socket adjustment, both allowing of instant removal of the scraper.

E are bearings in the ends of the frame F, adapted to be secured to the axle of the front wheel outside of the frame and under the axle-nut in the usual manner.

E'' is a clip form which can be used when desired to secure the scraper to the rear wheel. Said clip is then attached to one of the bars of the frame.

F are rods which constitute the body of a U-shaped frame which surrounds the wheel and supports the scraper A. Secured to or integral with these rods on their upper faces, at points near their ends, are upright ears F', which ears are provided with openings $F^2$ in the shape of quadrants. The scraper is pivoted near its central point to the rear of the frame and is provided in each edge with a hole H. A set-screw H' passes through the opening in the ears F' and enters these holes. This serves as a means for holding the scraper at any desired angle. $H^2$ are also openings which are located in the rods F near their ends, which register with the holes H in the scraper when the latter is horizontal. A set-screw or pin passes through the two in the same manner as before and holds the scraper in a horizontal position. This latter form is used only when the scraper is to be held in one of two positions. Obviously the scraper may be provided with screw-threaded pins which are secured to its edges and pass through the openings in the ears for the reception of a nut.

Having described our invention, what we claim, and desire to secure by Letters Patent of the United States, is—

1. A mud-guard consisting of an extensible frame surrounding the wheel, a scraper pivoted at one end thereof and provided with holes in its edges, an opening in the frame adapted to register with the holes in the scraper, and a set-screw passing through both for holding the scraper in position, substantially as described.

2. In a mud-guard the combination with a frame surrounding the wheel and upright ears on the frame near its free end, said ears being provided with curved openings; of a scraper pivoted to the free end of the frame and provided with holes in its edges adapted to register with the opening in the ears, and set-screws passing through the openings and entering the holes in the scraper for holding the latter in an adjusted position, substantially as set forth.

SAMUEL DUNLOP.
GEORGE HENRY OATWAY.

Witnesses:
H. M. DAVEY,
IVOR DAVEY.